United States Patent Office 2,920,050
Patented Jan. 5, 1960

2,920,050

WHETLERITE PRODUCT AND PROCESS

Francis E. Blacet and Robert J. Grabenstetter, Evanston, Ill., assignors to the United States of America as represented by the Secretary of War No Drawing. Application December 30, 1943
Serial No. 516,314

10 Claims. (Cl. 252—447)

The invention described herein may be manufactured and used by or for the Government for governmental purposes without the payment to us of any royalty thereon.

The present invention relates to gaseous absorbents and, more particularly, to absorbents that are useful for removing poisonous contaminants from air or other gases containing the same.

In the construction of gas masks, collective protectors and the like, which provide protection against various chemical warfare agents, it is necessary to provide absorbents which will give satisfactory protection against the several types of persistent and non-persistent gases that may be encountered in the field. By the term "absorbent" as used herein, it is intended to include broadly both phenomena known as "absorption" and "adsorption." In the past, activated charcoal has been widely used as an absorbent in gas masks for this purpose. It has been found that the effectiveness of the activated charcoal for absorbing certain non-persistent gaseous contaminants may be improved by impregnating the charcoal with certain metallic compounds to make whetlerite which is copper-treated carbon adapted to serve as an absorbent for poisonous gas, and named after one of the first inventors, Joshua C. Whetzel. One well-known type of this absorbent is disclosed in the U.S. Letters Patent No. 1,519,470, issued December 16, 1924, to Robert E. Wilson and Joshua C. Whetzel. Another well-known absorbent of this general character comprises an activated charcoal first impregnated with an aqueous solution of copper ammonium carbonate and thereafter dried at elevated temperatures. Whetlerites containing copper as the only metallic impregnant have not been entirely satisfactory for the reason that they are not effective for removing cyanogen chloride and arsine from air or other gases, particularly under conditions of high relative humidity. In the copending application of W. M. Latimer and H. W. Anderson, Serial No. 519,383, filed January 22, 1944, now abandoned, a new type of whetlerite comprising charcoal impregnated with copper and certain other metals is suggested which is capable of removing cyanogen chloride, arsine and other poisonous contaminants from gases containing the same. However, the cyanogen chloride life of the Latimer and Anderson product, when tested under conditions of high humidity, has not been found to be all that could be desired under certain conditions.

Accordingly, an object of this invention is the provision of an absorbent for gases which is particularly effective for removing cyanogen chloride from air or other gases containing the same under any conditions of temperature and humidity that may normally be encountered in the field.

A further object of this invention is the provision of an absorbent for gases which, while offering good protection against cyanogen chloride at high humidity, also gives good protection against other poisonous contaminants that may be encountered by the wearer of the gas mask.

An additional object of this invention is the provision of a process for preparing an absorbent having the above indicated properties.

Further and additional objects of this invention will appear from the following description and the appended claims.

In accordance with this invention, an absorbent for gases which is highly effective for removing cyanogen chloride from a gas containing the same at high humidities may be prepared by impregnating an activated base charcoal with an aqueous solution containing a compound of cupric copper, ammonia, carbon dioxide, a hexavalent chromium compound and silver nitrate, draining the solution from the resulting impregnated charcoal and thereafter drying the charcoal at an elevated temperature less than about 250° C. A modified whetlerite prepared in accordance with this briefly indicated method has been found to be very effective for removing non-persistent contaminants, such as hydrogen cyanide, phosgene, cyanogen, arsine and cyanogen chloride, from gases containing the same. This absorbent has all of the desirable properties of a standard whetlerite and, in addition, absorbs certain contaminants from air or other gases which are not absorbed by whetlerite. For example, a standard whetlerite containing copper as the only metallic impregnant is not effective for removing arsine and cyanogen chloride from air under conditions of high relative humidity. However, the new type of whetlerite prepared by the process of this invention has, when tested under standard conditions, a cyanogen chloride standard tube test life of over 100 minutes at high relative humidities. This is a marked improvement over the specific composition described in the above referred to Latimer et al. application, Serial No. 519,383.

In carrying out this invention, some consideration should be given to the selection of a satisfactory charcoal for the impregnating step, it having been found that certain charcoals differ considerably from others. For example, a charcoal that has been activated by means of steam or other activating gas has been found to be, in certain cases, superior to a charcoal that has been activated in the presence of metallic salts, such as zinc chloride. In accordance with one embodiment of this invention, the selected charcoal is impregnated with an aqueous solution containing 5% copper (as cupric), 8% ammonia, 5% carbon dioxide, 0.1% silver (as nitrate) and 1.7% chromium (as chromate). The concentrations of copper, ammonia and carbon dioxide may be varied from the values given above to about 9% copper, 12% ammonia and 10% carbon dioxide, it being desirable to keep the ratios of these three constituents approximately constant. Concentrations above the amounts previously suggested are not desirable because of the possibility of precipitating ammoniated copper chromate from the final solution. It has been found that between about 0.1% and 0.5% silver is preferable for the impregnation of any of the charcoals. However, more or less may be employed, if desired. The chromium percentage in the impregnating solution is preferably between 1.5 and 2.0% as the element.

In preparing the impregnating solution, the copper, ammonia and carbon dioxide solution is preferably prepared first. This may be done either from metallic copper, ammonia and carbon dioxide with the use of compressed air or from basic copper carbonate, ammonium carbonate and ammonia. The resulting solution should be tested for cuprous copper; and if any is found to be present, air should be passed through the solution until the cuprous copper is completely oxidized to cupric copper.

After the preparation of the copper, ammonia and carbon dioxide solution, chromium is next added. This may be done in the form of chromium trioxide ($CrO_3$) or ammonium dichromate. The chromium compound may be added in the solid form as desired, and it should be added slowly with vigorous stirring. For best results, the chromium should be in the form of a compound of hexavalent chromium.

After the chromium compound has bone into solution, the calculated amount of 20 to 30% silver nitrate solution is added with stirring.

The amounts of the several ingredients in the impregnating solution are calculated to give the approximate percentage composition as specified above.

This impregnating solution is employed to impregnate the activated base charcoal. During impregnation, it is desirable that all particles of the charcoal be brought into contact with a solution containing adequate silver. The charcoal is preferably wet uniformly and allowed to remain in contact with the solution for at least five minutes. Additional soaking will do no harm providing that in a continuous process the charcoal moves steadily through the solution in such a manner as not to prevent incoming material from being thoroughly mixed with the fresh incoming solution.

If desired, the silver nitrate solution may be added continuously at the proper rate directly from a separate tank rather than as a part of the principal solution, providing rapid mixing of the two solutions and the charcoal is accomplished. However, the addition of silver in this manner does not eliminate the desirability of removing the cuprous copper from the whetlerizing solution as above suggested.

In carrying out the process of this invention, it is not necessary to discard excess solution. In a continuous process, the solution should be added at such a rate as to maintain a constant liquid level in the impregnating tank, this rate depending upon the nature of the charcoal being used and upon the rate of charcoal movement. In order to obtain best results, care should be exercised not to add the silver-containing solution intermittently. The rate of adding the solution may be increased or decreased by as much as 20% of its average rate without materially affecting the product, but complete stoppage of the flow should not be permitted. In a batch impregnation process, the excess solution need not be discarded after the charcoal has been removed. However, the assumption should be made that all of the silver has been removed from this solution by the charcoal and more silver should be added to compensate for it.

After the charcoal has been impregnated as suggested in the foregoing, it should be thoroughly drained. The minimum drainage time necessary will depend upon the mesh size and the type of charcoal. A rough test of adequate drainage may be made by placing 250 cc. of the wet impregnated charcoal in a wire basket and vigorously shaking by hand. If good drainage has been accomplished, not more than 5 cc. of liquid will be removed from the charcoal by this treatment.

After draining, the charcoal is then put through a drier of any desired construction. The heat input of the drier is preferably maintained at such a rate that the temperature of the drain charcoal is raised to about 150° C. in approximately one hour. During this time, fresh air should be passed through the charcoal at such a rate that the atmosphere throughout the drier be replaced at least two or three times a minute. If desired, the air may be preheated to 150° C.; and this may be effected by mixing the air with the correct amount of a flue gas.

After the temperature in the drier has reached 150° C., the material should be maintained between 150 and 175° C. for one or two additional hours with the airstream maintained as above. The time required for this part of the drying will depend upon the extent of ammonia removal that is required. At no time during the drying is it desirable for the charcoal to come into contact with the drier walls or other objects which are at temperatures above 250° C.

The absorbent prepared as indicated in the foregoing has been found to be highly active when tested for the removal of hydrogen cyanide, phosgene, cyanogen, arsine and cyanogen chloride under a wide range of temperature and humidity conditions. A particular value of the absorbent is that it is effective for removing cyanogen chloride and arsine from a gas even under conditions of high relative humidity. The cyanogen chloride life of the sample prepared in accordance with the above described process may have a cyanogen chloride life of over 100 minutes when tested with a gas having a relative humidity of 80%.

In preparing the product having the desired degree of activity, it is important that the copper be present in the impregnating solution in the cupric state and that the chromium be present as a compound of hexavalent chromium. Also, it is important that the impregnated charcoal be dried at elevated temperatures but at a temperature less than 250° C.

While a particular embodiment of this invention has been disclosed in the foregoing, it is clear that this invention is not to be limited thereto; and it is contemplated that the present invention is to be restricted only by the scope of the appended claims.

We claim:

1. A process of preparing an absorbent for removing poisonous contaminants, including cyanogen chloride and arsine, from air or other gas containing the same which essentially consists in impregnating an activated base charcoal with a cuprous free aqueous solution consisting essentially only of water and the following substances dissolved therein in the approximate percentage:

| | Percent |
|---|---|
| Copper | 5 to 9 |
| Ammonia | 8 to 12 |
| Carbon dioxide | 5 to 10 |
| Silver | 0.1 to 0.5 |
| Chromium | 1.5 to 2.0 | draining the solution from the resulting impregnated charcoal, and thereafter drying said charcoal at an elevated temperature less than about 250° C., said copper being added in the form of basic ammonium-copper carbonate, said silver in the form of silver nitrate, and said chromium in the form of a compound of a group consisting of chromium trioxide and ammonium dichromate.

2. A process of preparing an absorbent for removing poisonous contaminants, including cyanogen chloride and arsine, from air or other gas containing the same which consists in impregnating an activated base charcoal for a period of at least five minutes with a freshly prepared cuprous-free aqueous solution consisting essentially only of water and the following substances dissolved therein in the approximate percentage:

| | Percent |
|---|---|
| Copper | 5 to 9 |
| Ammonia | 8 to 12 |
| Carbon dioxide | 5 to 10 |
| Silver | 0.1 to 0.5 |
| Chromium | 1.5 to 2.0 | draining the solution from the resulting impregnated charcoal, heating the drained charcoal under conditions to elevate the temperature of the charcoal to about 150° C. in a period of about one hour, further maintaining the heat at about 150 to 175° C. for a further period of one to two hours and thereafter cooling the resulting product, said copper being added in the form of cupric ammonium carbonate, said silver in the form of silver nitrate, said chromium in the form of a compound of a group consisting of chromium trioxide and ammonium dichromate.

3. The process recited in claim 2 wherein said heating is effected by passing a stream of heated gas containing oxygen into contact with the impregnated charcoal.

4. A process of preparing an absorbent for removing poisonous contaminants, including cyanogen chloride and arsine, from air or other gas containing the same which consists in impregnating an activated base charcoal for a period of at least five minutes with a freshly prepared cuprous-free aqueous solution consisting essentially only of water and the following substances dissolved therein in the approximate percentage:

| | Percent |
|---|---|
| Copper | 5.0 |
| Ammonia | 8.0 |
| Carbon dioxide | 5.0 |
| Silver | 0.1 |
| Chromium | 1.7 | draining the solution from the resulting impregnated charcoal, heating the drained charcoal under conditions to elevate the temperature of the charcoal to about 150° C. in a period of about one hour, further maintaining the heat at about 150 to 175° C. for a further period of one to two hours, and thereafter cooling the resulting product, said copper being added in the form of cupric ammonium carbonate, said silver in the form of $AgNO_3$ and said chromium in the form of a compound of a group consisting of chromium trioxide and ammonium dichromate.

5. A process for preparing a solution suitable for the impregnation of an activated base charcoal which consists in preparing a cuprous-free aqueous solution of cupric ammonium carbonate, adding a hexavalent soluble chromium compound to the resulting solution slowly with vigorous stirring, and thereafter adding a calculated amount of an aqueous solution of about 20 to 30% silver nitrate with stirring to provide an aqueous solution consisting essentially only of water and the following substances dissolved therein in the approximate percentage:

| | Percent |
|---|---|
| Copper | 5 to 9 |
| Ammonia | 8 to 12 |
| Carbon dioxide | 5 to 10 |
| Silver | 0.1 to 0.5 |
| Chromium | 1.5 to 2.0 | said copper being added in the form of cupric ammonium carbonate, said silver in the form of $AgNO_3$, said chromium in the form of a compound of a group consisting of chromium trioxide and ammonium dichromate.

6. The product prepared in accordance with the process of claim 1.

7. The product prepared in accordance with the process of claim 2.

8. The product prepared in accordance with the process of claim 3.

9. The product prepared in accordance with the process of claim 4.

10. The product prepared in accordance with the process of claim 5.

References Cited in the file of this patent
UNITED STATES PATENTS

| | | |
|---|---|---|
| 701,995 | Burgess | June 10, 1902 |
| 1,519,470 | Wilson | Dec. 16, 1924 |
| 1,520,437 | Pipkin | Dec. 23, 1924 |
| 1,771,396 | Caplan | July 29, 1930 |
| 1,849,503 | Mommaerts | Mar. 15, 1932 |
| 2,212,593 | Dittrich | Aug. 27, 1940 |
| 2,227,672 | Pier et al. | Jan. 7, 1941 |
| 2,511,288 | Morrell et al. | June 13, 1950 |
| 2,523,875 | Morrell et al. | Sept. 26, 1950 |